United States Patent

Suryanarayana et al.

(10) Patent No.: US 10,348,093 B2
(45) Date of Patent: Jul. 9, 2019

(54) MEDIUM VOLTAGE DIRECT CURRENT POWER COLLECTION SYSTEMS AND METHODS

(71) Applicant: ABB Schweiz AG, Baden (SE)

(72) Inventors: Harish Suryanarayana, Raleigh, NC (US); Hongrae Kim, Cary, NC (US); Sara Ahmed, Morrisville, NC (US); Peter Steimer, Ehrendingen (CH); Philippe Maibach, Muhen (CH); Hans Krattiger, Waukesha, WI (US); Silverio Alvarez, Aargau (SE); Paolo Casini, Arezzo (IT); Jiuping Pan, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 260 days.

(21) Appl. No.: 15/378,679

(22) Filed: Dec. 14, 2016

(65) Prior Publication Data

US 2018/0166881 A1 Jun. 14, 2018

(51) Int. Cl.
*H02J 1/10* (2006.01)
*H02J 3/38* (2006.01)
*H02H 7/26* (2006.01)

(52) U.S. Cl.
CPC .............. *H02J 3/383* (2013.01); *H02H 7/268* (2013.01); *Y02E 10/563* (2013.01)

(58) Field of Classification Search
CPC ............ H02H 7/268; H02J 3/383; H02J 3/38; H02M 3/24; H02M 7/44
USPC .......................................................... 307/52
See application file for complete search history.

(56) References Cited

U.S. PATENT DOCUMENTS

| | | | |
|---|---|---|---|
| 8,648,497 B2 | 2/2014 | Stern | |
| 2006/0054922 A1* | 3/2006 | Pettit | B82Y 10/00 257/116 |
| 2010/0156188 A1 | 6/2010 | Fishman | |
| 2010/0277001 A1 | 11/2010 | Wagoner | |
| 2011/0241433 A1 | 10/2011 | Sihier et al. | |
| 2011/0273016 A1 | 11/2011 | Aclest et al. | |
| 2012/0049635 A1 | 3/2012 | Schelenz | |

(Continued)

FOREIGN PATENT DOCUMENTS

WO 2016009047 1/2016

OTHER PUBLICATIONS

Search Report and Written Opinion, PCT Appln. No. PCT/US17/066345, dated Feb. 23, 2018, 9 pgs.

*Primary Examiner* — Rexford N Barnie
*Assistant Examiner* — Toan T Vu
(74) *Attorney, Agent, or Firm* — Taft Stettinius & Hollister LLP

(57) ABSTRACT

Unique systems, methods, techniques and apparatuses of a power collection system are disclosed herein. One exemplary embodiment is an MVDC collection system coupled to a utility grid including a collection bus, a plurality of branches coupled to the collection bus, and a branch controller. Each of the plurality of branches include a semiconductor switch coupled to the collection bus, and a DC/DC converter coupled to the semiconductor switch and an LVDC power source. The branch controller configured to determine a fault condition is occurring within the MVDC collection system, determine the location of the fault condition, and isolate the fault condition using at least one of the semiconductor switches and the DC/DC converters.

14 Claims, 6 Drawing Sheets

(56) References Cited

U.S. PATENT DOCUMENTS

| | | |
|---|---|---|
| 2013/0088086 A1 | 4/2013 | Coors et al. |
| 2013/0271888 A1* | 10/2013 | Falk .................... H02H 3/02 |
| | | 361/93.1 |
| 2014/0312959 A1 | 10/2014 | Wikstrom |
| 2015/0145330 A1* | 5/2015 | Eckel .................... H02J 3/36 |
| | | 307/24 |
| 2016/0099572 A1 | 4/2016 | Gupta |
| 2016/0285373 A1* | 9/2016 | Lin ...................... H02J 3/36 |
| 2016/0315467 A1 | 10/2016 | Eckel et al. |
| 2017/0126010 A1* | 5/2017 | Canales ................ H02M 3/28 |
| 2018/0026435 A1* | 1/2018 | Davidson ............. H01H 9/548 |
| | | 361/91.5 |

\* cited by examiner

MEDIUM VOLTAGE DIRECT CURRENT POWER COLLECTION SYSTEMS AND METHODS

BACKGROUND

The present disclosure relates generally to power collection systems. In some power collection systems, such as a power collection system for a large solar panel array, the voltage of the collected power must be increased to medium voltage levels to allow for efficient power transmission from the solar panel array to the utility grid. In some power collection systems, medium voltage direct current (MVDC) power transmission is more efficient to collect power compared to medium voltage alternating current power transmission. Existing power collection systems suffer from a number of shortcomings and disadvantages. There remain unmet needs including decreased protection system response time, decreased system downtime, and increased system flexibility. For instance, circuit breaker and relay based protection schemes may not adequately protect collection system components in MVDC collection systems where fault currents increase rapidly. Furthermore, in some power collection systems, a single fault may shut down an entire power collection system until it can be repaired by a technician. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for a power collection system. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
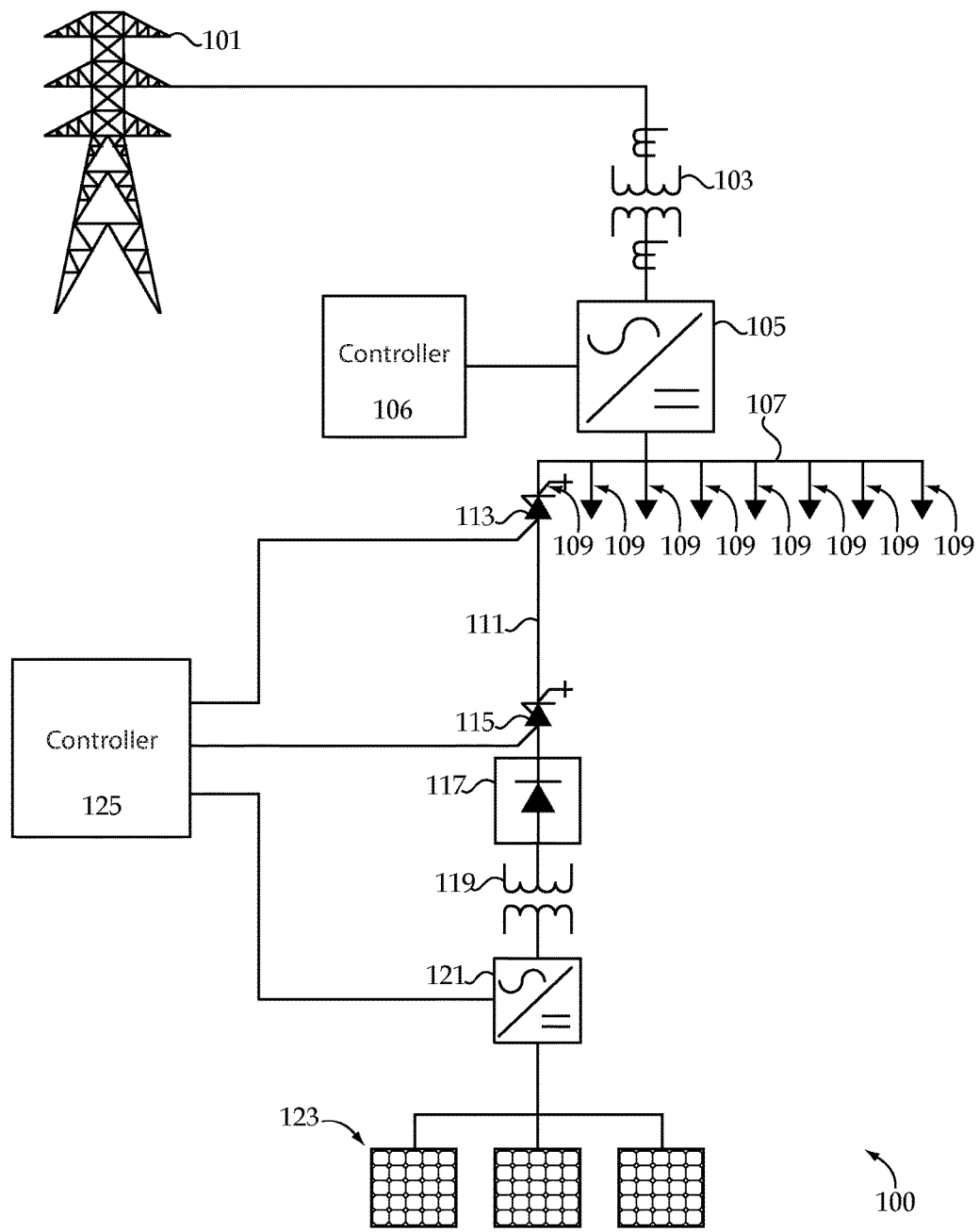
FIGS. 1-6 illustrate exemplary power collection systems.

With reference to FIG. 1 there is illustrated an exemplary medium voltage direct current (MVDC) power collection system 100 coupled to a plurality of solar panel arrays, including solar panel array 123, and a utility grid 101. System 100 is structured to collect low voltage direct current (LVDC) power from the plurality of solar panel arrays, convert the LVDC power to MVDC power, transmit the converted MVDC power to a collection bus through multiple radial branches, convert the MVDC power to medium voltage alternating current (MVAC) power with a grid inverter 105, step up the voltage of the MVAC with a transformer, and feed high voltage alternating current (HVAC) power HVAC power to utility grid 101, an HVAC transmission system. It shall be appreciated by a person having ordinary skill in the art that the voltage range for LVDC power is at least 1,000V to 1,500 V; the voltage range for MVDC power is at least ±5 kV to ±25 kV (10-50 kV); the voltage range for MVAC is at least 6.9-34.5 kV, and the voltage range for HVAC is at least 69-345 kV. It shall be appreciated that system 100 may be implemented in a variety of applications, including collecting power from fuel cells, collecting power from hybrid electric vehicle batteries, collecting power from other renewable energy resources such as wind and wave based power generators, collecting rectified power from another type of AC power source, or any other system structured to collect power from multiple sources with protection functionality to name but a few examples.

System 100 includes a collection bus 107 coupled to utility grid 101 by way of a grid inverter 105 and a transformer 103. Transformer 103 includes current sensors structured to measure electric characteristics of the input power and output power. Transformer 103 is structured to receive MVAC power from inverter 105, increase the voltage of the power from medium voltage to high voltage, and output the high voltage alternating current (HVAC) power to grid 101. In other embodiments of system 100, transformer 103 may not be needed. In certain embodiments, utility grid 101 may be replaced with another type of power drain, such as a microgrid, an energy storage device, an electric motor, or another system which uses or stores electric power.

An inverter controller 106 is coupled to inverter 105 and configured to operate inverter 105 so as to receive MVDC power from collection bus 107, convert the MVDC power to medium voltage alternating current (MVAC) power, and output the MVAC power to transformer 103. Controller 106 is also configured to control the DC link voltage on collection bus 107. Inverter 105 includes a plurality of switching devices arranged in a topology so as to convert DC power to AC power. For example, inverter 105 may be arranged in a cascade converter configuration such as a modular multi-level converter configuration. Controller 106 may be configured to operate inverter 105 by transmitting a plurality of activation signals to each of the switching devices of inverter 105. Activations signals may be generated using pulse width modulation. It shall be appreciated that any or all of the foregoing features of inverter 105 may also be present in the other inverters and converters disclosed herein.

A plurality of branches 109 is coupled in parallel to collection bus 107. It shall be appreciated that any or all of the following features of the illustrated branch may also be present in the other branches of system 100 disclosed herein. In the illustrated embodiment, system 100 includes eight branches 109. Other embodiments may include a greater or lesser number of branches 109.

The illustrated branch 109 includes a collection line 111 coupled to collection bus 107, a first semiconductor device 113 coupled to collection line 111. An additional semiconductor device 115 may be coupled to collection line 111 for certain applications such as those described below in connection with FIG. 3. In the illustrated embodiment, semiconductor devices 113 and 115 are integrated gate-commutated thyristors (IGCT). In other embodiments, devices 113 or 115 may be other types of semiconductor switching devices or may be coupled in parallel with a surge arrester.

Branch 109 includes a rectifier 117 coupled to collection line 111. A transformer 119 is coupled to rectifier 117 and a DC/AC converter 121 is coupled to transformer 119. Solar panel array 123 is coupled to DC/AC converter 121. Array 123 includes a plurality of photovoltaic (PV) panels coupled in series and/or in parallel based on the desired output voltage and output current of array 123. PV panels coupled in series increase the output voltage of array 123 and PV panels are coupled in parallel to increase output current of array 123.

System 100 is structured to receive DC power from solar panel array 123 with DC/AC converter 121, convert the DC power to AC power with DC/AC converter 121, step up the voltage of the AC power with transformer 119, convert the AC power with the stepped voltage to MVDC power with rectifier 117, and transmit MVDC power to collection bus 107 with collection line 111. In certain embodiments, rectifier 117 may be replaced with an active AC/DC converter.

System 100 includes a controller 125 configured to operate DC/AC converter 121, semiconductor device 113 and semiconductor device 115. In certain embodiments, controller 125 may include a plurality of controllers each configured to perform a portion of the functions described herein with respect to controller 125. During normal operation, controller 125 operates converter 121 so as to receive DC power from array 123, convert the power to AC power and output the AC power to transformer 119. Controller 125 may be configured to operate converter 121 so as to perform maximum power point tracking. Controller 125 operates semiconductor devices 113 and 115 so that current from array 123 flows to utility grid 101.

As explained in more detail below, semiconductor devices 113 and 115 are structured to disrupt the flow of current from solar panel array 123 to collection bus 107 in the event of a fault condition between solar panel array 123 and collection bus 107. A fault condition may be a short circuit fault, a high impedance fault, or a power electronic device failure. Since each branch 109 has the same arrangement of semiconductor devices 113 and 115, a fault one of the branches can be isolated and the other branches can continue to provide power to grid 101. It shall be appreciated that any or all of the foregoing features of system 100 may also be present in the other power collection systems disclosed herein.

Figure 2:
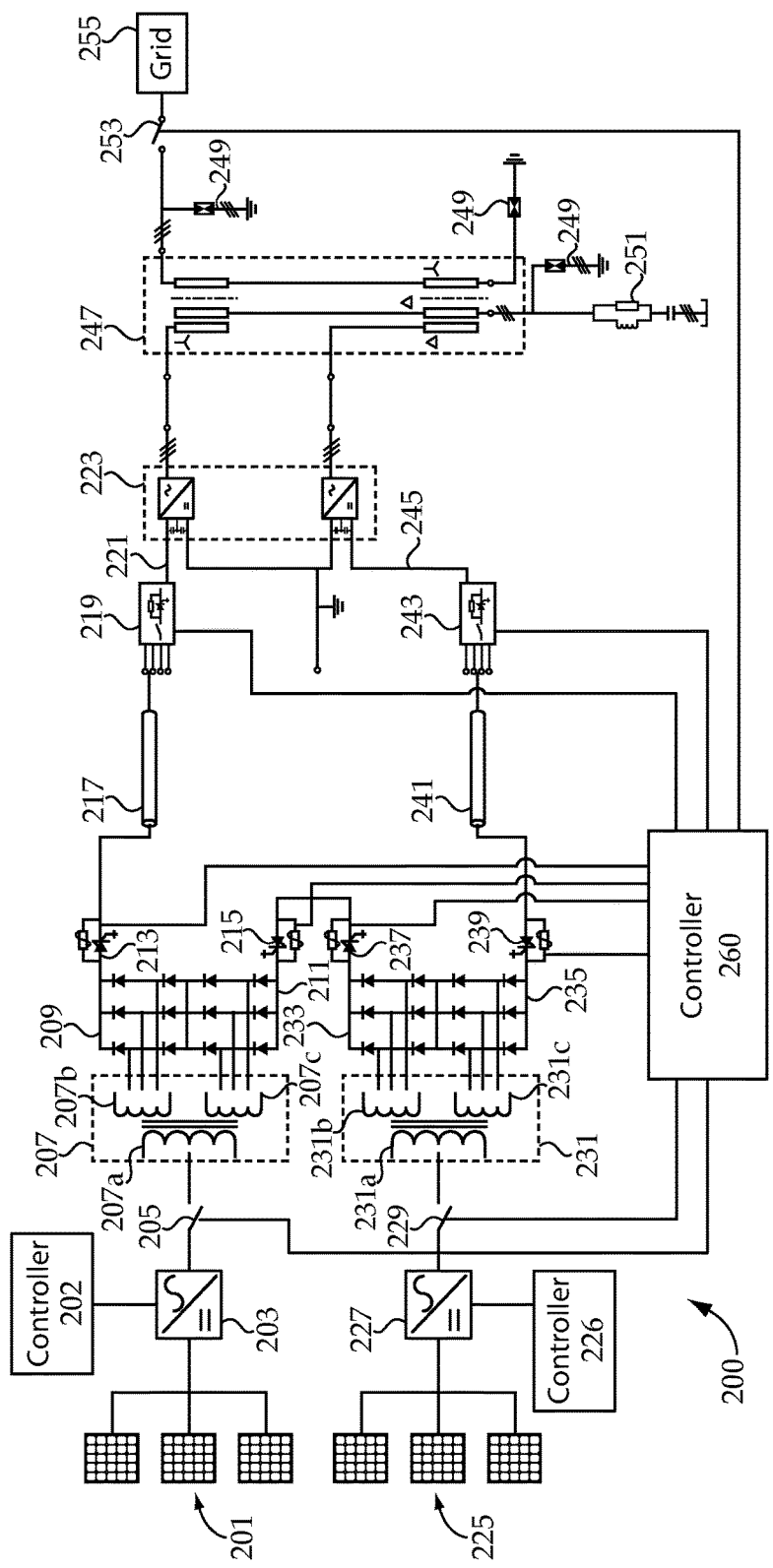

With reference to FIG. 2, there is illustrated an exemplary MVDC power collection system 200 coupled to grid 255 and a plurality of solar panel arrays including arrays 201 and 225. System 200 is structured to receive LVDC power from array 201, convert the LVDC power to MVDC power, collect the MVDC power from all the solar panel arrays, convert the MVDC power to HVAC power and output the HVAC power to the utility grid 255.

System 200 includes a PV inverter 203 coupled to solar panel array 201. A PV inverter controller 202 is configured to operate inverter 203 so as to receive DC power from array 201, convert the received DC power to AC power, and output the AC power. Controller 202 may be configured to optimize grid power injection with maximum power point tracking. A transformer 207 is coupled to PV inverter 203 and structured to receive AC power from PV inverter 203. An AC circuit breaker 205 is coupled between PV inverter 203 and transformer 207. Transformer 207 includes a primary winding 207a coupled to inverter 203, and two secondary windings 207b, 207c. Transformer 207 is structured to step up the voltage of the received AC power and output AC power with the stepped up voltage. A diode rectifier 209 is coupled to secondary winding 207b and a second diode rectifier 211 is coupled to secondary winding 207c. Rectifiers 209 and 211 are coupled in series.

System 200 includes a PV inverter 227 coupled to solar panel array 225. A PV inverter controller 226 is structured to operate inverter 227 so as to receive DC power from array 225, convert the received DC power to AC power, and output the AC power. A transformer 231 is coupled to PV inverter 227 and structured to receive AC power from PV inverter 227. An AC circuit breaker 229 is coupled between PV inverter 227 and transformer 231. Transformer 231 includes a primary winding 231a coupled to inverter 227, and two secondary windings 231b, 231c. Transformer 231 is structured to step up the voltage of the received AC power and output AC power with the stepped up voltage. A diode rectifier 233 is coupled to secondary winding 231b and another diode rectifier 235 is coupled to secondary winding 231c. Rectifiers 233 and 235 are coupled in series. Rectifier 211 is coupled in series to rectifier 233. Two protective devices 215 and 237 are coupled between rectifiers 211 and 233. Protective devices 215 and 237 each include a semiconductor switch, such as an IGCT, and a surge arrester coupled in parallel.

Rectifier 209 is coupled to a positive DC collection bus 221 by way of a collection line 217. A protective device 213 is operatively coupled to line 217. Protective device 213 includes an IGCT coupled in parallel with a surge arrester. Another protective device 219 is operatively coupled to line 217. Protective device 219 includes an IGCT coupled in parallel with a surge arrester and a disconnect switch coupled in series with the IGCT. System 200 includes additional collection lines not fully illustrated but including features similar to the arrangement described herein.

Rectifier 235 is coupled to a negative DC collection bus 245 by way of a collection line 241. A protective device 239 is operatively coupled to line 241. Protective device 239 includes an IGCT coupled in parallel with a surge arrester. Another protective device 243 is operatively coupled to line 241. Protective device 243 includes an IGCT coupled in parallel with a surge arrester and a circuit breaker or disconnect switch coupled in series with the IGCT. System 200 includes additional collection lines not fully illustrated but including features similar to the arrangement described herein.

A grid inverter 223 is coupled to positive DC collection bus 221 and negative DC collection bus 245. As illustrated in FIG. 2, for large PV farms, the common DC collection bus may comprise of two bus segments 221 and 245, and parallel inverters. Inverter 223 includes two DC/AC converters coupled at a neutral point. Inverter 223 is structured to receive MVDC power from collection buses 221 and 245, convert the MVDC power to MVAC power, and provide MVAC power to transformer 247. Inverter 223 is controlled so as to regulate the MVDC voltage on the collection buses 221 and 245, as well as the output current of inverter 223.

Transformer 247 is structured to receive MVAC power, step up voltage of the received power to a high voltage level, and output HVAC power to utility grid 255. System 200 includes an AC filter 251 structured to reduce harmonic distortion of the HVAC power, surge arresters 249 structured to selectively ground transformer 247, and an AC circuit breaker 253.

A controller 260 is coupled to and configured to operate AC circuit breakers 205, 229, and 253, as well as protective devices 213, 215, 237, 239, 219, and 243 so as to isolate faults within system 200. Controller 260 may open protective devices 213, 215, 237, 239, 219, and 243 within microseconds of detecting a fault condition, including a fault condition where the fault current is high, such as 2 kA.

Fault conditions include three typical fault cases: a fault located within a PV array or a PV inverter such as array 201 and inverter 203 or array 225 and inverter 227; a fault located on a DC collection line, such as collection lines 217 and 241; and a fault condition located on the DC collection bus 221, 245. For a fault inside array 201 or inverter 203, the protective devices 213 and 215 will be opened when the fault current reaches a protection setting value or a maximum allowable current for self-protection in order to isolate the fault from the collection lines 217 and 241. For a fault on a collection line such as line 217, protective device 219 will be opened when the fault current reaches a protection setting value or a maximum allowable current to isolate the corresponding collection line 217 from collection bus 221. In this fault case, PV inverters 203 and 227 on the faulted dc branch should be turned off. For galvanic isolation purposes, controller 260 may open circuit breakers 205 and 229. A third fault which can occur is a short circuit fault at the DC collection bus 221, 245. In this case, controller 260 opens protective devices 219 and 243 corresponding to each branch coupled to collection buses 221 and 245; controller 260 turns off PV inverters, including inverters 203 and 227; controller 260 opens AC circuit breaker 253; and finally, for galvanic isolation purposes, PV arrays will also be isolated by either AC circuit breaker 205 and 229.

For further improved reliability, additional protective devices including semiconductor switches may be operatively coupled to one of the collection lines 217 and 241. For example, a protective device may be added in the middle section of the collection line, such that remote cable section faults will not cause the outage of the entire DC branch. One feature of the illustrated embodiment is the absence of a DC capacitor coupled to the diode rectifiers 209, 211, 233, and 235. Since there is no capacitor discharging current when a DC fault occurs, the magnitude of the fault current is reduced. It shall be appreciated that any or all of the foregoing features of system 200 may also be present in the other power collection systems disclosed herein.

Figure 3:
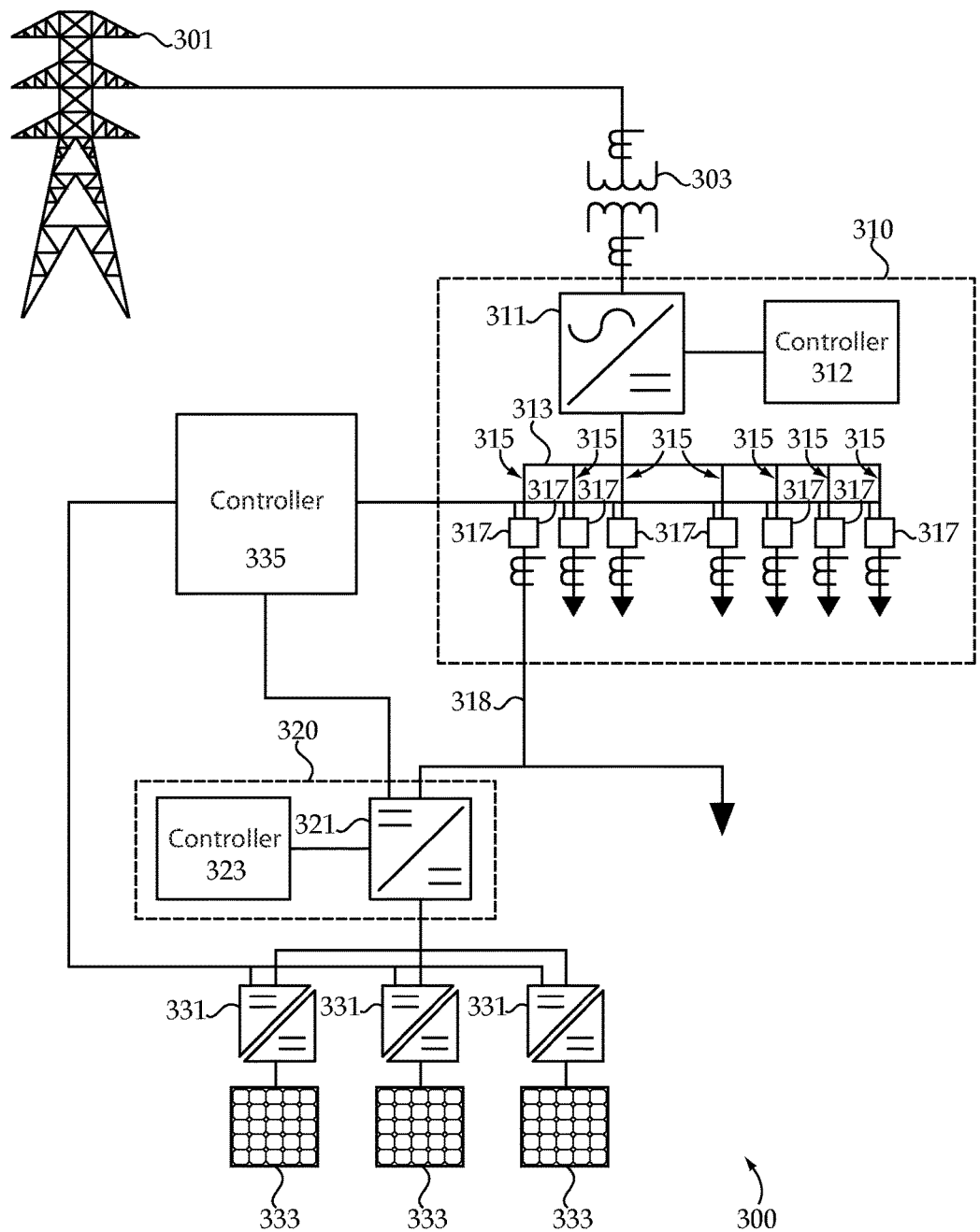

With reference to FIG. 3, there is illustrated an exemplary MVDC collection system 300 coupled to a plurality of solar panels 333 and a utility grid 301 by way of a step up voltage transformer 303. System 300 includes a substation 310 which includes a grid interface inverter 311 coupled to transformer 303, a collection bus 313 coupled to inverter 311, and a plurality of branch lines 315 coupled to collection bus 313. A protective device 317 is coupled to each of the plurality of branch lines 315. Protective device 317 includes a semiconductor switching device coupled in parallel with a surge arrester and may include another device such as a circuit breaker or a mechanical relay. Device 317 includes a current sensor structured to measure electric characteristics of the radial branch power. One of the plurality of branch lines 315 is illustrated in FIG. 3. The other branches 317 may have features similar to the illustrated branch.

In the illustrated embodiment, system 300 includes a plurality of isolated DC/DC converters 331, each coupled to one solar panel of the plurality of solar panels 333, and structured to receive DC power from the coupled solar panel 333, optimize DC power output using maximum power point tracking, and output DC power. In other embodiments, multiple solar panels of the plurality of solar panels 333 are coupled to a DC/DC converter of the plurality of DC/DC converter 331. Each isolated DC/DC converter 331 is coupled in parallel to a PV DC/DC station 320 including a second stage DC/DC converter 321 and a converter controller 323. PV DC/DC station 320 is coupled to one branch line 315. Converter controller 323 is configured to operate DC/DC converter 321 so as to receive DC power from the plurality of DC/DC converters 331, increase the voltage of the received DC power, and output MVDC power. As illustrated in FIG. 3, more than one PV DC/DC station 320 may be coupled in parallel to a single branch. In certain embodiments, the solar panels 333, the isolated DC/DC converters 331, and the PV DC/DC stations may be arranged in series to scale voltage levels or in parallel to scale power levels. In certain embodiments, station 320 may include a semiconductor-based protective device including a semiconductor switch, such as an IGCT, and a surge arrester coupled in parallel with the semiconductor switch.

MVDC power output by converter 321 is collected at DC collection bus 313. An inverter controller 312 is configured to operate inverter 311 so as to receive the collected MVDC power from DC collection bus 313, convert the MVDC power to MVAC power, and output the MVAC power. Transformer 303 is structured to receive the MVAC power from inverter 311, step up the voltage of the MVAC power, and output HVAC power to grid 301.

A protective device 317 is operatively coupled to each branch 315. A protection controller 335 is operatively coupled to each protective device 317 and configured to disrupt the flow of current from one branch to DC collection bus 313 in the event a fault condition is occurring on the branch. Controller 335 is also coupled to converter 321 and each of the plurality of converters 331, controller 335 being configured to disrupt the flow of current through one or more converters depending on the location of a detected fault.

Figure 4:
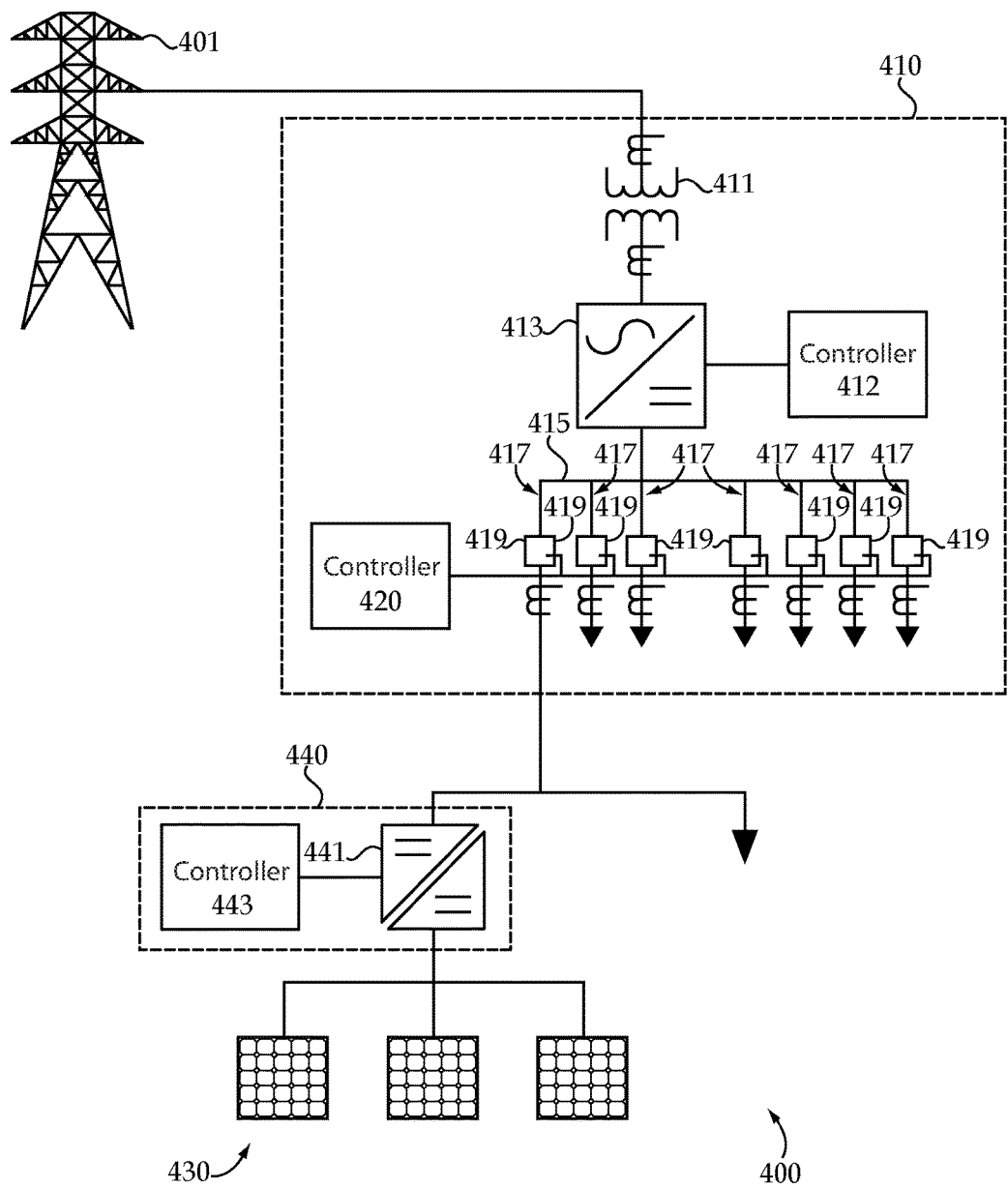

With reference to FIG. 4 there is illustrated an exemplary MVDC power collection system 400 coupled to a utility grid 401 and a plurality of solar panels, including solar panel array 430. System 400 is structured to collect MVDC power from the plurality of solar panels, convert the MVDC power to MVAC power, step up the voltage of the MVAC power to a high voltage level, and output high voltage AC power to grid 401.

System 400 includes an isolated PV DC/DC substation 440. The solar panels of solar panel array 430 are coupled in parallel to PV DC/DC substation 440. Specifically, substation 440 includes a DC/DC converter 441 coupled to solar panel array 430. Substation 440 also includes a converter controller 443 coupled to converter 441 and configured to operate converter 441 so as receive DC power from solar panels 430, perform maximum power point tracking, and output the converted MVDC power. In certain embodiments, substation 440 may include a semiconductor-based protective device including a semiconductor switch, such as an IGCT, and a surge arrester coupled in parallel with the semiconductor switch.

System 400 includes a DC/AC substation 410 structured to receive MVDC power from substation 440 as well as a plurality of other DC/DC substations not illustrated in FIG. 4. DC/AC substation 410 includes a transformer, an inverter 413, a DC collection bus 415, and a plurality of branches 417. The plurality of branches 417 is coupled to DC collection bus 415 and are structured to receive MVDC power from DC/DC substations such as DC/DC substation 440. DC collection bus 415 is also coupled to inverter 413 which is coupled to an inverter controller 412. Inverter controller 412 is configured to operate inverter 413 so as to receive the collected MVDC power from DC collection bus 415, convert the MVDC power to MVAC power, and output the MVAC power. Inverter controller 412 also operates inverter 413 so as to regulate the voltage on DC collection bus 415 and regulate the current of the MVAC power output with inverter 413. Transformer 411 receives the MVAC power output by inverter 413, steps up the voltage of the MVAC power to a high voltage level, and outputs the HVAC power to grid 101.

DC/AC substation includes a plurality of protective devices 419, each device being coupled to one of the plurality of branches 417. Each protective device 419 includes a current sensor structured to measure electric characteristics of the MVDC power. Each device 419 is controlled by a controller 420. When a fault occurs on one of the branches, controller 420 is configured to interrupt the flow of current from the affected branch to grid 101. Each of devices 419 includes a semiconductor device structured to disrupt the flow of MVDC power, such as an IGCT. Each of devices 419 may also include a circuit breaker or mechanical relay device.

Additional solar panel arrays may be coupled to the illustrated branch 417 by way of an additional DC/DC substation similar to substation 440. Similar arrangements of the devices and components coupled to the illustrated branch 417 may also be coupled to the other branches 417 not illustrated by FIG. 4.

Figure 5:
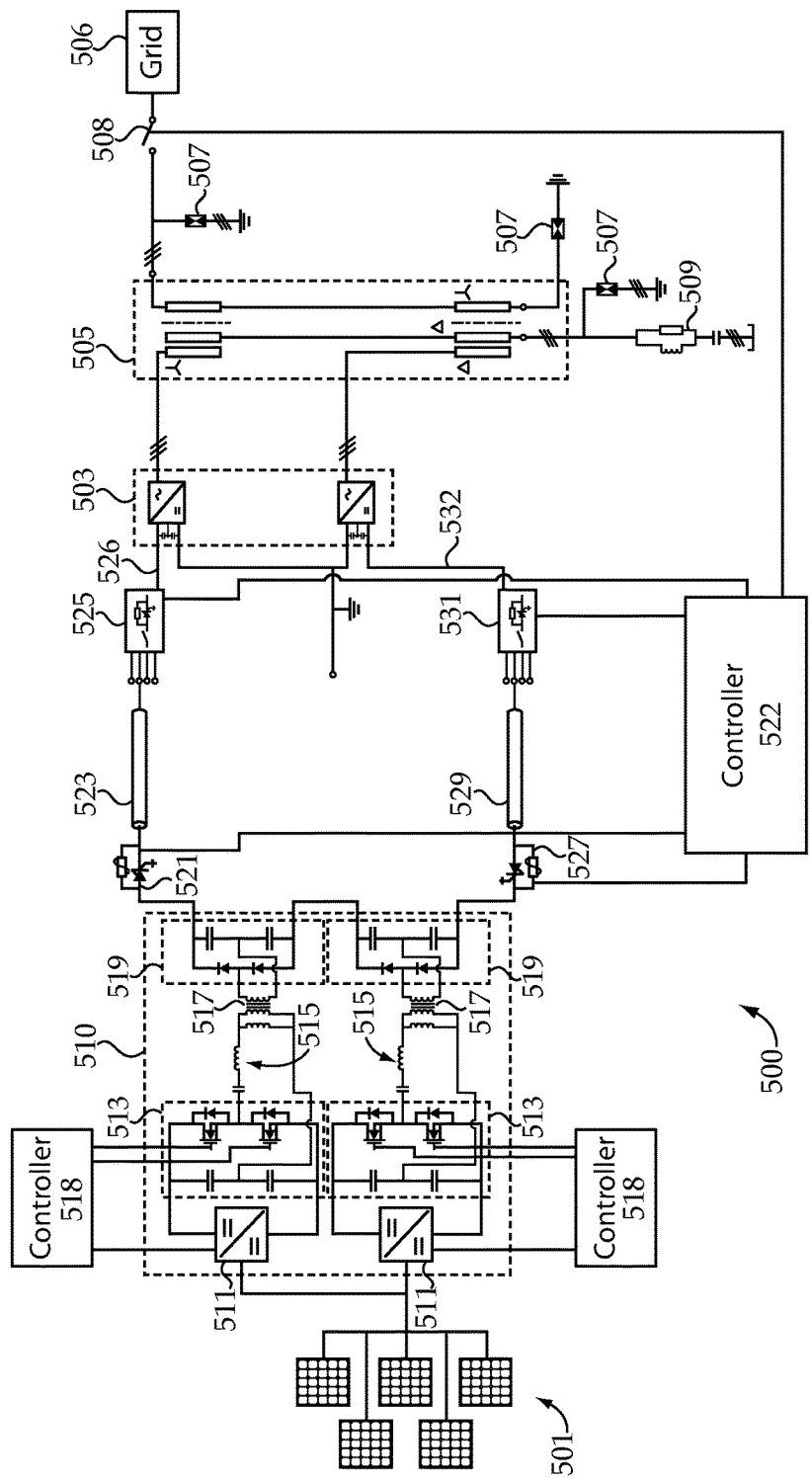

With reference to FIG. 5, there is illustrated an exemplary MVDC power collection system 500 coupled between a plurality of solar panel arrays, such as solar panel array 501, and a utility grid 506. System 500 is structured to receive LVDC power from array 501, convert the LVDC power to MVDC power, collect the MVDC power from all the solar panel arrays, convert the MVDC power to HVAC power and output the HVAC power to utility grid 506.

System 500 includes DC/DC resonant converter 510 including two current paths, each current path including a first stage DC/DC converter 511, an inverter 513 coupled to converter 511, an LC resonant tank 515 coupled to inverter 513, a step up transformer 517 coupled to tank 515, and a rectifier 519 coupled to transformer 517. Converter 510 is structured to receive DC power from array 501 by way of two parallel inputs, and output DC power by way of two series coupled outputs. In other embodiments, converter 510 is structured to receive DC power from array 501 by way of one input or by way of more parallel inputs, or output DC power by way of more series coupled outputs.

DC/DC converter 511 includes two controllers 518, each configured to operate first stage DC/DC converter 511 and inverter 513 for one current path. In other embodiments, a separate controller operates first stage DC/DC converter 511 and inverter 513 for each current path. In other embodiments, one controller operates first stage DC/DC converter 511 and inverter 513 for both current paths.

Controller 518 operates first stage DC/DC converter 511 so as to receive DC power from solar panel array 501, perform maximum power point tracking, and output DC power. Controller 518 then operates inverter 513 so as to receive DC power from converter 511, invert DC power, and output AC power. In the illustrated embodiment, inverter 513 includes wide bandgap devices, such as silicon carbide switching devices, structured to operate with a high switching frequency, such as 20 kHz. In other embodiments, inverter 513 includes another type of semiconductor switch instead of the wide bandgap devices. LC tank 515 includes a capacitor and two inductors, and is structured to reduce switching power losses of inverter 513. A high frequency transformer 517 receives the filtered AC power, steps up the voltage of the AC power, and outputs the AC power with stepped up voltage. Rectifier 519 receives AC power from transformer 517, converts the AC power to DC power, and outputs the converted DC power.

Since converter 510 is a galvanic isolated modular resonant DC/DC converter, converter 510 provides a high efficiency and power density for the LVDC to MVDC conversion stage as well as a modular approach using basic conversion cells. Different topologies for the inverter 513 and the rectifier 519 stages of the galvanic isolated DC/DC converter 510 can be applied to the basic conversion cells of the isolated DC/DC converter 510 impacting the total number of cells to interconnect in series and/or in parallel configuration according to the required voltage and power. In certain embodiments, complementary redundancy and system protection functions are included within the galvanic isolated DC/DC converter.

Converter 510 is coupled to a positive DC collection bus 526 by way of a collection line 523. A protective device 521 is operatively coupled to line 523. Protective device 521 includes an IGCT coupled in parallel with a surge arrester. A second protective device 525 is operatively coupled to line 523. Protective device 525 includes an IGCT coupled in parallel with a surge arrester and a circuit breaker coupled in series with the IGCT. System 500 includes additional collection lines not fully illustrated but including features similar to the arrangement described herein coupling array 501 with positive DC collection bus 526.

Converter 510 is coupled to a negative DC collection bus 532 by way of a collection line 529. A protective device 527 is operatively coupled to line 529. Protective device 527 includes an IGCT coupled in parallel with a surge arrester. A second protective device 531 is operatively coupled to line 529. Protective device 531 includes an IGCT coupled in parallel with a surge arrester and a circuit breaker coupled in series with the IGCT.

A grid inverter 503 is coupled to positive DC collection bus 526 and negative DC collection bus 532. Inverter 503 is structured to receive MVDC power, convert the MVDC power to MVAC power, and provide MVAC power to transformer 505. Transformer 505 is structured to receive MVAC power, step up voltage of the received power to a high voltage level, and output HVAC power to utility grid 506. System 500 includes an AC filter 509 structured to reduce harmonic distortion of the HVAC power, surge arrester devices 507 structured to selectively protect system 500 from damage due to overvoltage, and a circuit breaker 508.

System 500 includes a protection controller 522 coupled to and configured to operate protective devices 521, 525, 527, and 531, as well as AC circuit breaker 508. Controller 522 is configured to isolate a fault condition as described above with respect to controller 260 of FIG. 2.

Figure 6:
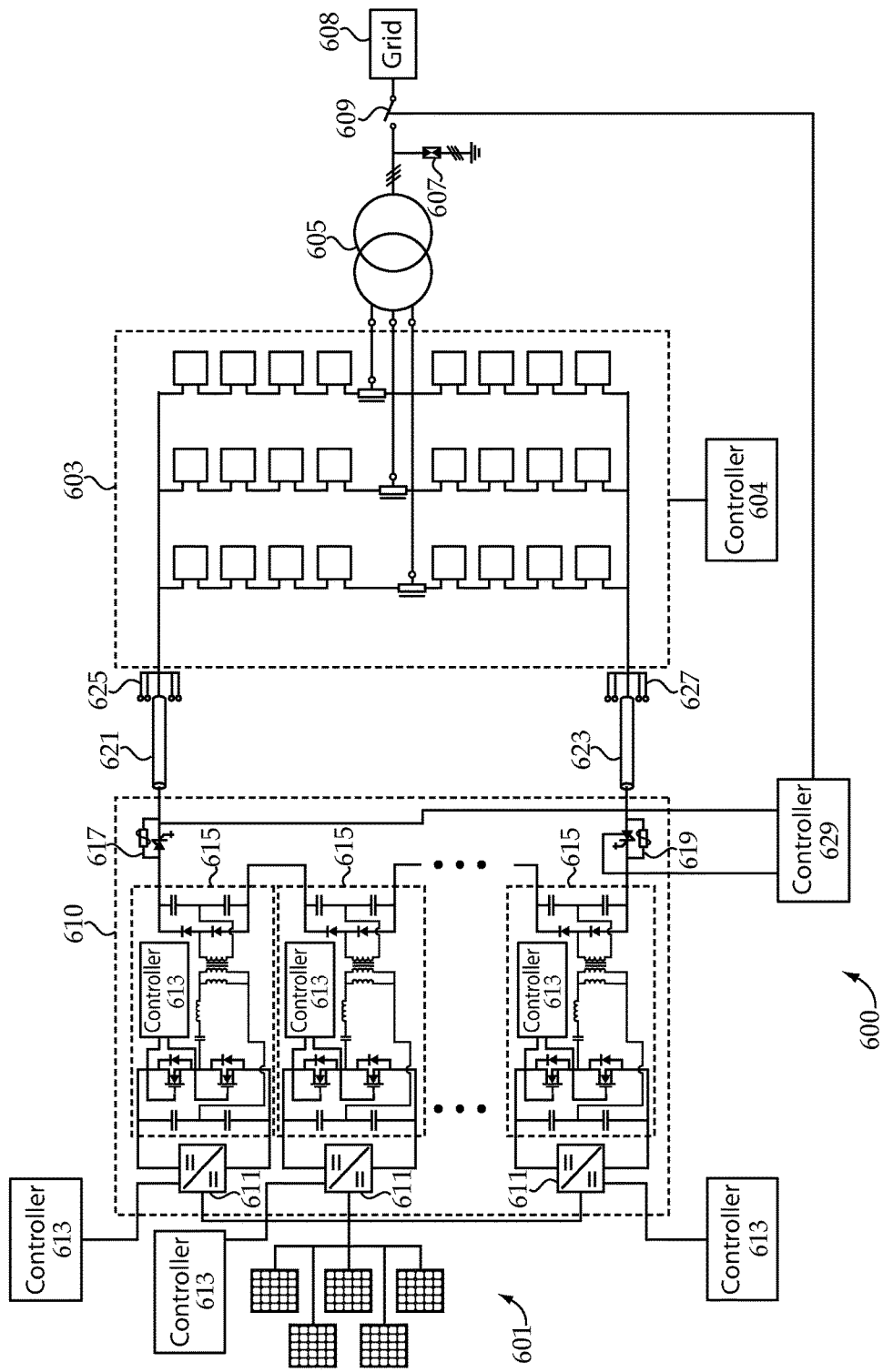

With reference to FIG. 6 there is illustrated an exemplary MVDC power collection system 600 coupled between a plurality of solar panel arrays, such as solar panel array 601, and a utility grid 608. System 600 is structured to receive LVDC power from array 601, convert the LVDC power to MVDC power, collect the MVDC power from the solar panel arrays, convert the MVDC power to HVAC power, and output the HVAC to the utility grid 608.

System 600 includes DC/DC resonant converter 610 including multiple current paths, each current path including a first stage DC/DC converter 611 and a second stage DC/DC converter which includes an inverter coupled to converter 611, an LC resonant tank coupled to the inverter, a step up transformer coupled to the LC resonant tank, a rectifier coupled to the transformer, and a controller 613 configured to operate the semiconductor switches of converter 615. Converter 610 is structured to receive DC power from array 601 by way of multiple parallel inputs, and output DC power by way of two series coupled outputs.

Each DC/DC converter 611 is controlled with a converter controller 613. Each converter controller 613 is configured to operate converter 611 so as to receive DC power from solar panel array 601, perform maximum power point tracking, and output DC power. The controller of converter 615 operates the converter so as to receive DC power from converter 611, convert the DC power to AC power under soft switching conditions, convert the AC power to DC power, and output DC power. Converter 615 is structured to provide transformer isolation.

Converter 610 is coupled to a positive DC collection bus 625 by way of a collection line 621. A protective device 617 is operatively coupled to line 621. Protective device 617 includes an IGCT coupled in parallel with a surge arrester. Converter 610 is coupled to a negative DC collection bus 627 by way of a collection line 623. A protective device 619 is operatively coupled to line 623. Protective device 619 includes an IGCT coupled in parallel with a surge arrester.

A modular multilevel converter (MMC) 603 is coupled to positive MVDC collection bus 625 and negative MVDC collection bus 627. An MMC controller 604 is structured operate MMC 603 so as to receive MVDC power from buses 625 and 627, convert the MVDC power to MVAC power, and output MVAC power to transformer 605. Transformer 605 is structured to receive the MVAC power, step up the voltage of the received power to a high voltage level, and output HVAC power to grid 608. A circuit breaker 609 and a surge arrester 607 are operatively coupled between transformer 605 and grid 608.

System 600 includes a protection controller 629 coupled to and configured to operate protective devices 617 and 619, as well as circuit breaker 609. Controller 629 is configured to isolate a fault condition as described above with respect to controller 260 of FIG. 2.

Further written description of a number of exemplary embodiments shall now be provided. One embodiment is a medium voltage direct current (MVDC) power collection system comprising a power collection bus; and a branch comprising a collection line coupled to the power collection bus; a power converter coupled to the collection line, and structured to receive low voltage direct current (LVDC) power from an LVDC power source, convert the received LVDC power to MVDC power, and output the MVDC power to the collection line; a semiconductor switch coupled in parallel with a surge arrester and coupled in series between the power converter and the DC collection bus; and a collection system controller configured to determine a fault condition is occurring on the branch and to isolate the fault condition from the power collection bus using the semiconductor switch of the branch.

In certain forms of the foregoing system, the collection system controller is configured to determine a fault condition is occurring on the collection line of the branch, to open the semiconductor switch of the branch, and to isolate the fault condition from the DC power source coupled to the branch using the power converter of the branch. In certain forms, the power converter of one of the branches includes a plurality of DC/DC converters, each DC/DC converter including an output, wherein the outputs of the DC/DC converters are coupled in series. In certain forms, the system comprises a semiconductor switch coupled between each DC/DC converter coupled in series. In certain forms, the system comprises a plurality of semiconductor switches, each semiconductor switch being coupled to the output of one of the plurality of DC/DC converters. In certain forms, the collection system controller is configured to determine the fault condition is occurring within the DC power source and to isolate the DC power source from the collection line of the branch using the power converter. In certain forms, the system comprises a converter controller configured to operate the power converter, to determine the fault condition is occurring within the DC power source and to isolate the DC power source from the collection line of the branch using the power converter. In certain forms, the DC power source for each branch includes a solar panel array. In certain forms, the power converter of each branch is operated so as to optimize the power output of each solar panel array using maximum power point tracking.

Another exemplary embodiment is an MVDC collection system coupled to a utility grid including a collection bus; a plurality of branches coupled to the collection bus, each branch including a semiconductor switch coupled in parallel with a surge arrester and coupled in series to the collection bus, and a DC/DC converter coupled to the semiconductor switch and an LVDC power source; and a branch controller configured to determine a fault condition is occurring within the MVDC collection system, determine the location of the fault condition, and isolate the fault condition using at least one of the semiconductor switches and the DC/DC converter.

In certain forms of the foregoing system, the system comprises a DC/AC converter coupled to the collection bus structured to receive MVDC power from the collection bus and convert the MVDC power to AC power, and a transformer coupled between the AC/DC converter and a utility grid, the transformer structured to receive the AC power, step up the voltage of the AC power, and output the AC power with stepped up voltage to the utility grid. In certain forms, the system comprises an AC circuit breaker coupled between the DC/AC converter and the utility grid, wherein the branch controller is coupled to the AC circuit breaker and configured to determine a fault condition is occurring within the collection bus and to open the semiconductor switches of each branch and the AC circuit breaker in response to determining a fault condition is occurring within the collection bus. In certain forms, medium voltage includes a range from 10 kV to 50 kV. In certain forms, the DC/DC converter for at least one of the branches includes an inverter, a transformer, and a diode rectifier. In certain forms, the DC/DC converter includes an AC circuit breaker coupled between the inverter and the diode rectifier, and the branch controller is configured to open the AC circuit breaker in response to determining a fault condition is occurring within the MVDC collection system. In certain forms, at least one semiconductor switch includes an integrated gate commutated thyristors (IGCTs) coupled in parallel with a surge arrester. In certain forms, a fault condition includes one of a DC power source malfunction, a short circuit fault or a high impedance fault within one of the plurality of branches, or a short circuit fault or a high impedance fault within the collection bus. In certain forms, at least one of the DC/DC converters includes a wide bandgap switching device.

A further exemplary embodiment is a method for operating an MVDC collection system comprising coupling a plurality of DC power sources to a plurality of power converters; coupling each of the plurality of power converters to a protection device including a semiconductor switch and a surge arrester coupled in parallel to the semiconductor switch; coupling each of the protection devices to a power collection bus; operating each power converter so as to receive LVDC power from one of the plurality of DC power source, converter the LVDC power to MVDC power, and output MVDC power to the power collection bus; determining a fault condition is occurring within the MVDC collection system; determining the location of the fault condition; and isolating the fault condition using one of the protection devices.

In certain forms of the foregoing method, determining the location of the fault condition includes determining a fault condition is occurring between one of the power converters and the power collection bus and isolating the fault condition using one of the protection devices includes opening the semiconductor switch closest to the location of the fault condition and isolating one of the DC power sources from the fault condition using the power converter closest to the fault condition location. In certain forms, determining the location of the fault condition includes determining a fault condition is occurring within the collection bus and isolating the fault condition using one of the protection devices includes opening the semiconductor switch of each protective device and isolating the collection bus from the utility grid. In certain forms, the method comprises coupling a second protective device including a semiconductor switch between each first protective device and the collection bus, wherein determining the location of the fault condition includes determining a fault condition is occurring between one of the first protective devices and one of the second protective devices, and isolating the fault condition using one of the protection devices includes opening the first protective device and the second protective device.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A medium voltage direct current (MVDC) power collection system comprising:
    a power collection bus; and
    a branch comprising:
        a collection line coupled to the power collection bus by a first protective device including a first semiconductor switch coupled in parallel with a first surge arrester; and
        a power converter coupled to the collection line by a second protective device including a second semiconductor switch coupled in parallel with a second surge arrester, and structured to receive low voltage direct current (LVDC) power from an LVDC power source, convert the received LVDC power to MVDC power, and output the MVDC power to the collection line; and
    a collection system controller configured to determine if a first fault condition is occurring at the power converter or the LVDC power source and in response to open the second protective device to isolate the LVDC power source and the power converter from the collection line, and to determine if a second fault condition is occurring at the collection line and in response open the first protective device to isolate the collection line from the power collection bus.

2. The system of claim 1 comprising a second branch comprising:
    a second collection line coupled to the power collection bus by a third protective device including a third semiconductor switch coupled in parallel with a third surge arrester; and
    a second power converter coupled to the second collection line by a fourth protective device including a fourth semiconductor switch coupled in parallel with a fourth surge arrester, and structured to receive low voltage direct current (LVDC) power from an second LVDC power source, convert the received LVDC power to MVDC power, and output the MVDC power to the second collection line,
    wherein the collection system controller configured to determine if a third fault condition is occurring at the power collection bus and in response open the first protective device to isolate the collection line and the second collection line from the power collection bus.

3. The system of claim 1 wherein the power converter includes a plurality of DC/DC converters, each DC/DC converter including an output, wherein the outputs of the DC/DC converters are coupled in series.

4. The system of claim 1 wherein the DC power source for each branch includes a solar panel array.

5. The system of claim 4 wherein the power converter of each branch is operated so as to optimize the power output of each solar panel array using maximum power point tracking.

6. An MVDC collection system coupled to a utility grid including:
    a collection bus;
    a plurality of branches coupled to the collection bus, each branch including:
        a semiconductor switch coupled in parallel with a surge arrester and coupled in series to the collection bus, and
        a DC/DC converter coupled to the semiconductor switch and an LVDC power source; and
        a branch controller configured to determine a fault condition is occurring within the MVDC collection system, determine the location of the fault condition, and isolate the fault condition using at least one of the semiconductor switches and the DC/DC converter;

wherein the DC/DC converter for at least one of the branches includes an inverter, a transformer, and a diode rectifier, and the DC/DC converter includes an AC circuit breaker coupled between the inverter and the diode rectifier; and wherein the branch controller is configured to open the AC circuit breaker in response to determining a fault condition is occurring within the MVDC collection system.

7. The system of claim 6 comprising a DC/AC converter coupled to the collection bus structured to receive MVDC power from the collection bus and convert the MVDC power to AC power, and a transformer coupled between the AC/DC converter and a utility grid, the transformer structured to receive the AC power, step up the voltage of the AC power, and output the AC power with stepped up voltage to the utility grid.

8. The system of claim 7 comprising an AC circuit breaker coupled between the DC/AC converter and the utility grid, wherein the branch controller is coupled to the AC circuit breaker and configured to determine a fault condition is occurring within the collection bus and to open the semiconductor switches of each branch and the AC circuit breaker in response to determining a fault condition is occurring within the collection bus.

9. The system of claim 6, wherein medium voltage includes a range from 10 kV to 50 kV.

10. The system of claim 6 wherein at least one semiconductor switch includes an integrated gate commutated thyristors (IGCTs) coupled in parallel with a surge arrester.

11. The system of claim 6 wherein a fault condition includes one of a DC power source malfunction, a short circuit fault or a high impedance fault within one of the plurality of branches, or a short circuit fault or a high impedance fault within the collection bus.

12. The system of claim 6 wherein at least one of the DC/DC converters includes a wide bandgap switching device.

13. A method for operating an MVDC collection system comprising:

coupling a plurality of DC power sources to a plurality of power converters;

coupling a plurality of collection lines to a power collection bus by a respective plurality of first protective devices each including a first semiconductor switch coupled in parallel with a first surge arrester;

coupling each of the plurality of power converters to a respective one of the plurality of collection lines by a respective plurality of second protection devices each including a second semiconductor switch and a second surge arrester coupled in parallel to the second semiconductor switch;

operating each power converter so as to receive LVDC power from one of the plurality of DC power sources, converter the LVDC power to MVDC power, and output MVDC power to the power collection bus;

determining if a first fault condition is occurring at one of the plurality of DC power sources or one of the plurality of power converters and in response opening one of the plurality of second protective devices corresponding to the one of the plurality of DC power sources or the one of the plurality of power converters at which the first fault condition is occurring; and determining if a second fault condition is occurring at one of the plurality of collection lines and in response opening one of the plurality of first protective device to isolate the one of the collection lines at which the second fault condition is occurring from the power collection bus.

14. The method of claim 13 comprising determining if a third fault condition is occurring at the power collection bus and in response opening each of the plurality of first protective devices to isolate each of the plurality of collection lines from the power collection bus.

* * * * *